H. W. YOST.
WATER MOTOR.
APPLICATION FILED AUG. 23, 1909.
976,972.
Patented Nov. 29, 1910.
3 SHEETS—SHEET 1.
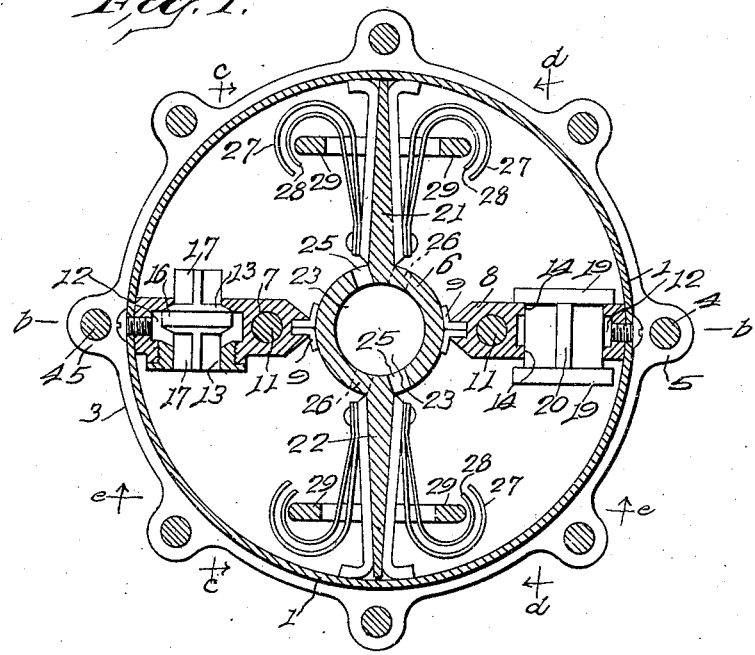
Witnesses
F. Howard Walmsley,
Edward L. Reed.
Inventor
Henry W. Yost,
By H. A. Toulmin,
Attorney

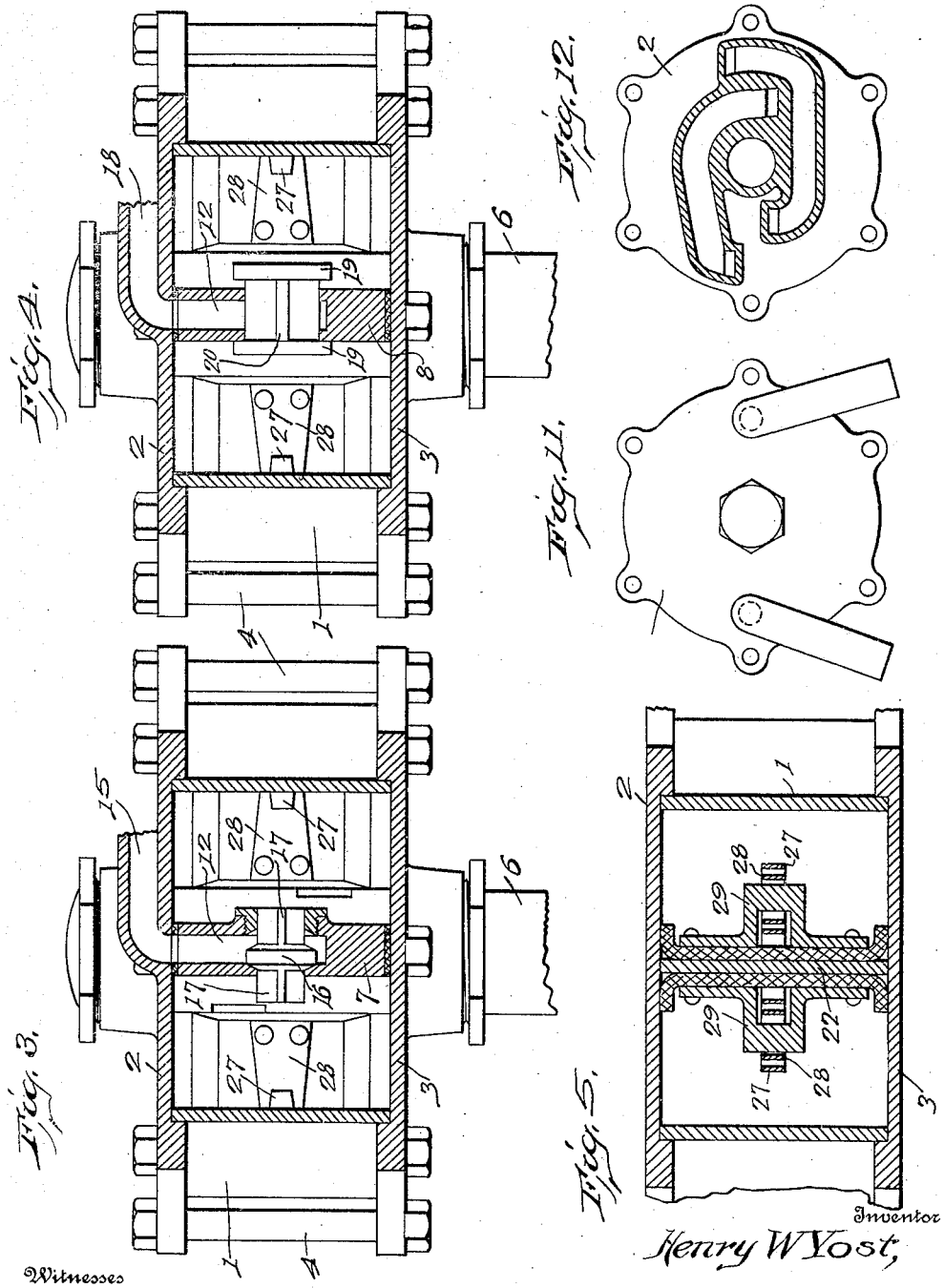

H. W. YOST.
WATER MOTOR.
APPLICATION FILED AUG. 23, 1909.
976,972.
Patented Nov. 29, 1910.
3 SHEETS—SHEET 3.
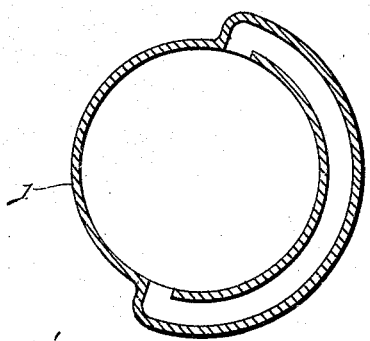
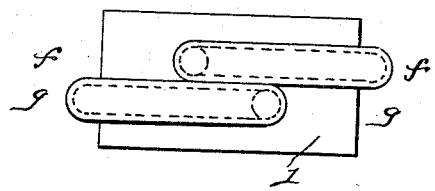
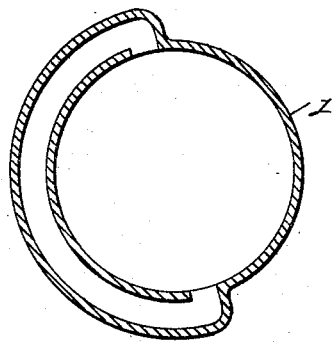
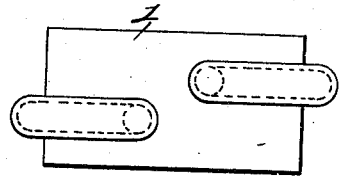
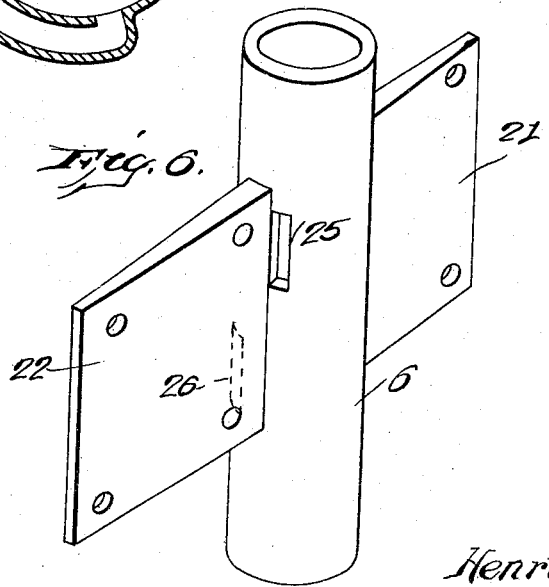
Witnesses
G. Howard Walmsley,
Edward L. Reed.
Inventor
Henry W. Yost,
By H. A. Toulmin,
Attorney ced the
UNITED STATES PATENT OFFICE.

HENRY W. YOST, OF SPRINGFIELD, OHIO, ASSIGNOR TO THE YOST GEARLESS MOTOR COMPANY, OF SPRINGFIELD, OHIO, A CORPORATION OF OHIO.

WATER-MOTOR.

976,972.

Specification of Letters Patent.  Patented Nov. 29, 1910.

Application filed August 23, 1909. Serial No. 514,118.

*To all whom it may concern:*

Be it known that I, HENRY W. YOST, a citizen of the United States, residing at Springfield, in the county of Clark and State of Ohio, have invented certain new and useful Improvements in Water-Motors, of which the following is a specification, reference being had therein to the accompanying drawings.

This invention relates to water motors, and the object of the same is to provide a motor which will exert a greater turning force upon the shaft.

To this end it is a further object of the invention to provide the motor with a plurality of pistons, each of which acts simultaneously upon the shaft.

It is also an object of the invention to provide a spring for throwing the inlet and exhaust valves over the "dead-center", which spring will accommodate itself to different loads and to the variations of water pressure.

With these objects in view the invention consists in certain novel features and in certain combinations and arrangements of parts hereinafter to be described, and then more particularly pointed out in the claims.

In the accompanying drawings, Figure 1 is a sectional view, taken on the line *a a* of Fig. 2 and looking in the direction of the arrows; Fig. 2 is a vertical section, taken on the line *b b* of Fig. 1; Fig. 3 is a vertical section, taken on the line *c c* of Fig. 1; Fig. 4 is a vertical section, taken on the line *d d* of Fig. 1; Fig. 5 is a vertical section, taken on the line *e e* of Fig. 1; Fig. 6 is a detail view of the shaft and the pistons carried thereby; Fig. 7 is a horizontal, sectional view, taken on the line *f f* of Fig. 9, showing a modified form of the invention; Fig. 8 is a sectional view, taken on the line *g g* of Fig. 9; Figs. 9 and 10 are side elevations of the modified form of motor shown in Figs. 7 and 8; Fig. 11 is a top plan view of another modification of the invention; and Fig. 12 is a bottom plan view, partly in section, of the modification shown in Fig. 11.

In Figs. 1 to 6 of these drawings I have illustrated one embodiment of my invention and have shown the same as comprising a cylinder consisting of a cylindrical casing 1 having cylinder heads 2 and 3 which are connected thereto and to each other by means of bolts 4 extending through apertured lugs 5 carried by the respective cylinder heads. Journaled in the cylinder heads 2 and 3 is a motor shaft 6, to which the pistons are connected. Abutments 7 and 8 are mounted within the cylinder and divide the interior thereof into two chambers. In the present instance these abutments are arranged on diametrically opposite sides of the shaft 6 and are secured at their outer edges to the cylinder casing 1 and are provided at their inner edges and at their upper and lower ends with packing, as shown at 9 and 10, to form a water-tight contact between the abutment and the shaft and cylinder head, respectively. The abutments are further secured in position by means of bolts 11 which extend through both cylinder heads and through the abutment and serve not only to firmly secure the abutment in position within the cylinder, but also to prevent any expansion of the cylinder heads under water pressure, thereby preventing leakage about the ends of the abutments. These abutments are provided with inlet and exhaust ports which communicate with the chambers within the cylinder and are connected to exhaust and waste pipes. As here shown, I have arranged the inlet in one abutment and the exhaust in the other, and, to this end, each abutment is provided with a chamber 12 which communicates with the two chambers of the cylinder by means of ports 13 and 14 formed in the respective abutments. The chamber in the abutment 7 forms the inlet chamber and is connected with an inlet pipe 15. A valve 16 is mounted within the chamber 12 of the abutment 7 and is provided with guides 17 extending through the ports 13. The chamber 12 of the abutment 8 forms the exhaust chamber and is connected with an exhaust pipe 18 and the ports 14 thereof are controlled by an exhaust valve comprising the two valve members 19 adapted to seat against the outer surface of the abutment and connected one to the other by a guide 20 which extends through the ports 14 in the abutment.

A piston is mounted in each of the chambers of the cylinder and these pistons are preferably arranged on diametrically opposite sides of the shaft 6 and are rigidly secured to that shaft, as shown at 21 and 22. Those portions of the two chambers lying in the rear of their respective pistons and forming the compression compartments are in communication with each other, preferably by means of conduits extending through the shaft 6, and, likewise, those portions of the chambers in front of the pistons and forming the exhaust compartments are in communication with each other by means of conduits. These conduits may be of any suitable character, but, in the present instance, I have provided the shaft 6 with cavities 23 and 24 which are connected with their respective compartments by means of ports 25 and 26. When water is admitted through the inlet valve to one compression compartment a portion of the same will immediately pass through one of the conduits and into the other compression compartment, and thus the two pistons are both placed under a uniform pressure and are simultaneously actuated to exert a turning force upon the shaft 6. The water in one exhaust compartment escapes directly through the exhaust chamber in the abutment 8 and the water from the other exhaust compartment escapes through the conduit in the shaft 6 and through the first-mentioned exhaust compartment to the exhaust chamber.

Each piston, 21 and 22, is provided on each side with a spring to throw the valves over the "dead-center," and, to enable these springs to readily accommodate themselves to different loads and to variations of pressure, I have formed the same in two parts, each part comprising a flat spring secured at one end to the respective piston and having its other end curved, as shown. One of the parts, 27, of the spring is longer and its curved portion is of greater diameter than the other portion 28 of the spring. The part 28 of the spring is arranged within the part 27 and has its curved portion spaced some distance from the curved portion of the part 27. Owing to the difference in the diameters of the two parts of the springs they will have different degrees of resiliency, the curved portion of the part having the larger diameter being considerably softer than the inner portion of the spring. This difference can be further accentuated by employing materials of different degrees of stiffness. As the piston approaches one of the abutments, the outer portion, 27, of the spring will engage the valve or valve stem, as the case may be, and will be compressed. If the load is light and the pressure low this spring will be of sufficient strength to unseat the valve and throw the same across its dead-center, but, should the load be heavy or the pressure high, the softer portion of the spring will be compressed against the inner and stiffer portion thereof and the entire spring compressed, and, when the valve has been forced from its seat, the entire spring will expand and throw the valve across its dead-center. The two parts of the spring preferably extend through an apertured lug 29 which is secured to the face of the piston and which serves both to retain the two parts of the spring in their proper position and also to limit the compression of the spring.

The operation of the motor will be readily understood from the foregoing description and it will be apparent that the construction is such as to provide a motor which, while the length of its stroke is materially shortened, exerts a very great turning force upon the shaft and is particularly adapted for use where a short powerful stroke is required, as in the operation of an oscillating wash tub. It will further be apparent that the construction is an exceedingly simple one having few moving parts and these of such a construction that they cannot be easily disarranged or broken; and further, that the springs carried by the pistons for shifting the valves are so constructed that they will accommodate themselves to variations of water pressure and to different loads which may be imposed upon the motor, thereby insuring the prompt action of the valves and further insuring that they will be thrown across their dead-centers.

While I have shown and described one form of my invention it will be obvious that the construction and arrangement of parts can be greatly varied without departing from the principle of the invention. For instance, the conduits connecting the two compression compartments and the two exhaust compartments of the chambers in the cylinder may be formed in any desirable manner, and, in Figs. 7 to 10, I have shown a motor casing with these conduits formed on the outside thereof and extending circumferentially thereto, while, in Figs. 11 and 12, I have shown the conduits formed in one of the cylinder heads. Therefore, I wish it to be understood that I do not desire to be limited to the details of construction shown and described, for obvious modifications will occur to a person skilled in the art.

Having thus fully described my invention, what I claim as new and desire to secure by Letters Patent, is:—

1. In a water motor, a cylinder, a shaft journaled in said cylinder, abutments mounted in said cylinder on opposite sides of said shaft, one of said abutments having inlet ports connected to a source of supply and communicating with the interior of said cylinder on each side of said abutment, the other of said abutments having exhaust ports communicating with the interior of said cylinder on each side of said abutment and connected with an exhaust pipe, valves to control said ports, pistons connected to the opposite sides of said shaft, conduits connecting that portion of the interior of the cylinder lying between the abutment having the inlet port and one of the pistons with the space lying between the abutment having the exhaust port and the other of said pistons, and a two part spring secured to each side of each of said pistons and adapted to actuate the respective valves.

2. In a motor, the combination, with a cylinder, a piston mounted therein, and a valve adapted to be actuated by the movement of said piston, of a spring carried by one of said members and comprising two parts having different degrees of resiliency.

3. In a motor, the combination, with a cylinder, a piston mounted therein, and a valve adapted to be actuated by the movement of said piston, of a spring carried by said piston and comprising two flat springs having their outer ends curved, the curved portion of one part of said spring being of less diameter than the curved portion of the other part of said spring and being arranged within the curved portion of said other part of said spring.

4. In a motor, the combination, with a cylinder, a piston mounted therein, and a valve adapted to be actuated by the movement of said piston, of a spring carried by said piston and comprising two flat springs having their outer ends curved, the curved portion of one part of said spring being of less diameter than the curved portion of the other part of said spring and being arranged within the curved portion of said other part of said spring, and an apertured lug carried by said piston adapted to receive the two parts of said spring to support the same in their proper positions and to form a stop to limit the compression thereof.

In testimony whereof, I affix my signature in presence of two witnesses.

HENRY W. YOST.

Witnesses:
   ELZA F. McKEE,
   EDWARD L. REED.